(12) United States Patent
Nussbaum et al.

(10) Patent No.: US 8,806,207 B2
(45) Date of Patent: Aug. 12, 2014

(54) SYSTEM AND METHOD FOR SECURING DATA

(75) Inventors: Lawrence Edward Nussbaum, Newtown (AU); Stephen Thompson, Eastwood (AU)

(73) Assignee: Cocoon Data Holdings Limited, Sydney (AU)

( * ) Notice: Subject to any disclaimer, the term of this patent is extended or adjusted under 35 U.S.C. 154(b) by 358 days.

(21) Appl. No.: 12/809,758

(22) PCT Filed: Dec. 22, 2008

(86) PCT No.: PCT/AU2008/001898
§ 371 (c)(1),
(2), (4) Date: Oct. 26, 2010

(87) PCT Pub. No.: WO2009/079708
PCT Pub. Date: Jul. 2, 2009

(65) Prior Publication Data
US 2011/0040964 A1 Feb. 17, 2011

Related U.S. Application Data

(60) Provisional application No. 61/021,271, filed on Jan. 15, 2008.

(30) Foreign Application Priority Data

Dec. 21, 2007 (AU) ................................ 2007907016

(51) Int. Cl.
*H04L 29/06* (2006.01)
*H04L 9/32* (2006.01)
*G06F 21/60* (2013.01)

(52) U.S. Cl.
CPC .......... *H04L 63/101* (2013.01); *H04L 63/0428* (2013.01); *H04L 9/3226* (2013.01); *G06F 21/606* (2013.01); *G06F 2221/2115* (2013.01)
USPC .................. 713/170; 726/4; 726/28; 380/278

(58) Field of Classification Search
CPC . H04L 63/101; H04L 63/0428; H04L 9/3226; G06F 21/606; G06F 2221/2115
USPC .......................... 713/170; 726/4, 28; 380/278
See application file for complete search history.

(56) References Cited

U.S. PATENT DOCUMENTS

| | | | |
|---|---|---|---|
| 4,897,875 | A | 1/1990 | Pollard et al. |
| 5,200,999 | A | 4/1993 | Matyas et al. |
| 5,475,757 | A | 12/1995 | Kelly |
| 5,495,533 | A | 2/1996 | Linehan et al. |
| 5,586,260 | A | 12/1996 | Hu |
| 5,602,918 | A | 2/1997 | Chen et al. |

(Continued)

FOREIGN PATENT DOCUMENTS

| | | |
|---|---|---|
| CN | 1473414 | 2/2004 |
| CN | 1859772 | 11/2006 |

(Continued)

OTHER PUBLICATIONS

International Search Report; PCT/AU2008/001898; C. McCarthur; Feb. 4, 2009.

(Continued)

*Primary Examiner* — Michael Pyzocha
(74) *Attorney, Agent, or Firm* — Siritzky Law, PLLC

(57) ABSTRACT

The present invention provides a method for securing data distributed by a first user to at least one recipient user, comprising the steps of; responding to a request from the first user to encrypt the data with a key; and recording the location of the key in a database, wherein on the database receiving a request from the at least one recipient user for authorization, providing the key to the at least one recipient user upon authorization.

27 Claims, 7 Drawing Sheets

(56) References Cited

U.S. PATENT DOCUMENTS

| | | |
|---|---|---|
| 5,615,268 A | 3/1997 | Bisbee et al. |
| 5,748,735 A | 5/1998 | Ganesan |
| 5,764,887 A | 6/1998 | Kells et al. |
| 5,841,865 A | 11/1998 | Sudia |
| 5,848,161 A | 12/1998 | Luneau et al. |
| 5,864,667 A | 1/1999 | Barkan |
| 5,933,498 A | 8/1999 | Schneck |
| 6,009,173 A | 12/1999 | Sumner |
| 6,011,849 A | 1/2000 | Orrin |
| 6,023,700 A | 2/2000 | Owens et al. |
| 6,055,314 A | 4/2000 | Spies et al. |
| 6,067,623 A | 5/2000 | Blakley et al. |
| 6,104,716 A | 8/2000 | Crichton et al. |
| 6,158,007 A | 12/2000 | Moreh |
| 6,160,891 A | 12/2000 | Al-Salqan |
| 6,230,156 B1 | 5/2001 | Hussey |
| 6,247,127 B1 | 6/2001 | Vandergeest |
| 6,286,104 B1 | 9/2001 | Buhle et al. |
| 6,289,105 B1 | 9/2001 | Murota |
| 6,314,409 B2 | 11/2001 | Schneck |
| 6,324,648 B1 | 11/2001 | Grantges, Jr. |
| 6,442,686 B1 | 8/2002 | McArdle et al. |
| 6,510,464 B1 | 1/2003 | Grantges et al. |
| 6,560,581 B1 | 5/2003 | Fox et al. |
| 6,581,162 B1 | 6/2003 | Angelo et al. |
| 6,584,564 B2 | 6/2003 | Olkin |
| 6,606,663 B1 | 8/2003 | Liao et al. |
| 6,611,498 B1 | 8/2003 | Baker et al. |
| 6,668,327 B1 | 12/2003 | Prabandham et al. |
| 6,728,884 B1 | 4/2004 | Lim |
| 6,735,310 B1 | 5/2004 | Hsing et al. |
| 6,760,752 B1 | 7/2004 | Liu et al. |
| 6,782,003 B1 * | 8/2004 | Giroux et al. .................. 370/466 |
| 6,792,416 B2 | 9/2004 | Soetarman et al. |
| 6,826,696 B1 | 11/2004 | Chawla et al. |
| 6,892,307 B1 | 5/2005 | Wood et al. |
| 6,895,510 B1 | 5/2005 | Benantar et al. |
| 6,898,577 B1 | 5/2005 | Johnson |
| 6,918,041 B1 | 7/2005 | Chen |
| 6,944,762 B1 | 9/2005 | Garrison |
| 7,016,875 B1 | 3/2006 | Steele et al. |
| 7,065,547 B2 | 6/2006 | Persels et al. |
| 7,113,994 B1 | 9/2006 | Swift et al. |
| 7,146,009 B2 | 12/2006 | Andivahis et al. |
| 7,194,547 B2 | 3/2007 | Moreh |
| 7,231,049 B2 | 6/2007 | Kawaguchi et al. |
| 7,233,948 B1 | 6/2007 | Shamoon |
| 7,277,549 B2 | 10/2007 | Olkin |
| 7,325,127 B2 | 1/2008 | Olkin |
| 7,363,495 B2 | 4/2008 | Felt et al. |
| 7,373,330 B1 * | 5/2008 | Klebe ............................. 705/51 |
| 7,376,835 B2 | 5/2008 | Olkin |
| 7,499,716 B2 | 3/2009 | Helferich |
| 7,594,116 B2 | 9/2009 | Bruns |
| 7,693,285 B2 | 4/2010 | Curry |
| 7,716,477 B2 | 5/2010 | Omori et al. |
| 7,730,142 B2 | 6/2010 | LeVasseur |
| 7,783,044 B2 | 8/2010 | Moreh |
| 7,783,711 B2 | 8/2010 | LeVasseur |
| 7,783,883 B2 | 8/2010 | Gasparini |
| 7,818,573 B2 | 10/2010 | Martin |
| 7,822,201 B2 | 10/2010 | Shamoon |
| 7,822,820 B2 | 10/2010 | LeVasseur |
| 7,823,135 B2 | 10/2010 | Horning |
| 7,827,114 B2 | 11/2010 | Pinkas |
| 7,827,603 B1 | 11/2010 | Lan |
| 7,831,823 B2 | 11/2010 | Ginter |
| 7,840,799 B2 | 11/2010 | Brown |
| 7,844,813 B2 | 11/2010 | Henson |
| 7,844,835 B2 | 11/2010 | Ginter |
| 7,870,198 B2 | 1/2011 | Graham |
| 7,877,594 B1 | 1/2011 | DiSanto |
| 7,882,351 B2 | 2/2011 | Serret-Avila |
| 7,904,568 B2 | 3/2011 | Rudd |
| 7,904,707 B2 | 3/2011 | Shear |
| 7,917,745 B2 | 3/2011 | Janes |
| 7,917,749 B2 | 3/2011 | Ginter |
| 7,925,898 B2 | 4/2011 | Shear |
| 7,930,360 B2 | 4/2011 | Sibert |
| 7,933,829 B2 | 4/2011 | Goldberg |
| 7,940,928 B2 | 5/2011 | Sibert |
| 7,941,836 B2 | 5/2011 | Pinkas |
| 7,971,055 B2 | 6/2011 | Weeks |
| 7,979,542 B2 | 7/2011 | Strohwig |
| 7,984,509 B2 | 7/2011 | Ginter |
| 7,987,514 B2 | 7/2011 | Shamoon |
| 7,995,761 B2 | 8/2011 | Yoshimura et al. |
| 8,001,388 B2 | 8/2011 | Horne |
| 8,006,087 B2 | 8/2011 | Ginter |
| 8,015,607 B1 | 9/2011 | Appelman |
| 8,055,729 B2 | 11/2011 | Warasawa |
| 8,055,913 B2 | 11/2011 | Ginter |
| 8,090,940 B1 | 1/2012 | Fenton |
| 8,099,046 B2 | 1/2012 | Helferich |
| 8,099,601 B2 | 1/2012 | Serret-Avila |
| 8,104,075 B2 | 1/2012 | Spector |
| 8,108,417 B2 | 1/2012 | Franks |
| 8,112,625 B2 | 2/2012 | Ginter |
| 8,116,741 B2 | 2/2012 | Helferich |
| 8,117,185 B2 | 2/2012 | Franks |
| 8,117,273 B1 | 2/2012 | Mathur et al. |
| 8,130,952 B2 | 3/2012 | Shamoon |
| 8,135,645 B2 | 3/2012 | Kay |
| 8,140,850 B2 | 3/2012 | Horne |
| 8,141,165 B2 | 3/2012 | Ginter |
| 8,156,554 B2 | 4/2012 | Fenton |
| 8,181,021 B2 | 5/2012 | Ginter |
| 8,185,473 B2 | 5/2012 | Ginter |
| 8,185,478 B2 | 5/2012 | Pinkas |
| 8,190,528 B2 | 5/2012 | Ginter |
| 8,191,157 B2 | 5/2012 | Ginter |
| 8,191,158 B2 | 5/2012 | Ginter |
| 8,209,544 B2 | 6/2012 | Maheshwari |
| 8,219,798 B1 | 7/2012 | DiSanto |
| 8,224,294 B2 | 7/2012 | Helferich |
| 8,230,489 B2 | 7/2012 | Pinkas |
| 8,291,238 B2 | 10/2012 | Ginter |
| 8,315,393 B2 | 11/2012 | Moreh |
| 8,316,449 B2 | 11/2012 | Ginter |
| 8,335,834 B2 | 12/2012 | Youstra |
| 8,336,101 B2 | 12/2012 | Aaron |
| 2001/0047484 A1 | 11/2001 | Medvinsky et al. |
| 2002/0144119 A1 | 10/2002 | Benantar |
| 2003/0081784 A1* | 5/2003 | Kallahalla et al. ............ 380/277 |
| 2003/0081785 A1 | 5/2003 | Boneh et al. |
| 2003/0147536 A1 | 8/2003 | Andivahis et al. |
| 2003/0182246 A1 | 9/2003 | Johnson et al. |
| 2004/0128541 A1 | 7/2004 | Blakley et al. |
| 2004/0139319 A1 | 7/2004 | Favazza et al. |
| 2004/0165727 A1* | 8/2004 | Moreh et al. .................. 380/278 |
| 2005/0097441 A1* | 5/2005 | Herbach et al. ............ 715/501.1 |
| 2006/0075228 A1* | 4/2006 | Black et al. .................... 713/167 |
| 2007/0204078 A1* | 8/2007 | Boccon-Gibod et al. ....... 710/54 |
| 2007/0242824 A1 | 10/2007 | Vishik |
| 2008/0002830 A1* | 1/2008 | Cherkasov et al. ........... 380/277 |
| 2008/0165972 A1* | 7/2008 | Worthington ................ 380/278 |
| 2009/0276625 A1* | 11/2009 | Huang et al. ................. 713/168 |

FOREIGN PATENT DOCUMENTS

| | | |
|---|---|---|
| CN | 101009553 A | 8/2007 |
| CN | 101047829 A | 10/2007 |
| WO | WO 99/41900 | 8/1999 |
| WO | WO99/41900 | 8/1999 |
| WO | WO02/15530 | 2/2002 |
| WO | WO 02/15530 | 2/2002 |
| WO | WO2005/076270 | 8/2005 |
| WO | WO 2005/076270 | 8/2005 |

OTHER PUBLICATIONS

Australian First Examination Report dated Oct. 4, 2010 for AU 2008341026.

(56) References Cited

OTHER PUBLICATIONS

International Preliminary Report on Patentability dated Jun. 22, 2010 for PCT Application No. PCT/AU2008/001898 filed Dec. 22, 2008.
A. Menezes, et al., Handbook of Applied Cryptography, Chapter 10: Identification and Entity Authentication ED, CRC Press, 1996, pp. 385-424.
A. Menezes, et al., Handbook of Applied Cryptography, Chapter 12: Key Establishment Protocols ED, CRC Press, 1996, pp. 489-541.
A. Menezes, et al., Handbook of Applied Cryptology, Chapter 13: Key Management Techniques ED, CRC Press, 1996, pp. 543-590.
Australian Patent Office, Office Action in AU 2008341026, Dec. 8, 2011 [2 pgs.]
CN 10147829, Application No. 200610066550, English language Abstract, Mobile Multimedia Service Implementing Method and Condition Liu Chongli, et al., Receiving System, Appl. filed Mar. 30, 2006, Huawei Tech. Co., Ltd.
CN1859772 English Language Abstract, Appl. Num. 200610032731, Safety Service Communication Method Based on General Authenficiation Frame, Huawei Tech. Co. Ltd, App. Date Jan. 7, 2006, Pub. Date Nov. 8, 2006.
CN20061172266 English language Abstract, Secret Key Safety Method and System for Realizing Multi-Network Integration Mobile Multi-Media Broadcasting System, ZTE Corp., published Aug. 1, 2007.
English Language Abstract of CN1473414., Appl. No. 01818388, Method for Securing Digital Information and System Thereof, Markany, Inc., App Date Nov. 20, 2001, Pub. Date Feb. 4, 2004.
EPO, Search Report, EP 08865360, dated Jun. 27, 2012 [8 pgs.]
New Zealand Intellectual Property Office, Examination Report mailed Dec. 20, 2011 in NZ Appln. No. 586279.
State Intellectual Property Office of the People's Republic of China, First Office Action mailed Aug. 22, 2012 in CN Appln. No. 200880126865.5 [English translation, 10 pgs.]
WIPO, Internationl Search Report PCT/AU2008/001898, completed Feb. 4, 2009, mailed Feb. 11, 2009.

* cited by examiner

```xml
<?xml version="1.0" encoding="utf-8"?>
<secobj version="1">
    <!-- This is a Cocoon Data Secure Envelope
                For more information visit www.cocoondata.com -->
    <header>
        <doc>SVRID-1234-5678-9012-3456-7890</doc>
        <server id="ENCRYPTED://gatekeeper.cocoondata.com">
                gatekeeper.cocoondata.com
        </server>
        <title>title</title>
        <desc>document description</desc>
        <author>document author name</author>
        <date>document creation date</date>
        <hash>header hash code</hash>
    </header>
    <manifest version="1">
        <file type="ext" size="####" date="YYYY-MMM-DD HH:MM:SS">
                [System File Name & Extension]
        </file>
        <file type="ext" size="####" date="YYYY-MMM-DD HH:MM:SS">
                [System File Name & Extension]
        </file>
    </manifest>
    <content bytes="#####">...ASCII encoded binary data....</content>
</secobj>
```

FIG. 5

SYSTEM AND METHOD FOR SECURING DATA

This application is a national phase application of International Application No. PCT/AU2008/001898, filed Dec. 22, 2008 and published, in English, Jul. 2, 2009, which claims priority to U.S. Provisional Application No. 61/021,271, filed Jan. 15, 2008 and Australian Patent Application No. 2007907016, filed Dec. 21, 2007. The above-referenced applications are hereby incorporated by reference herein in their entirety.

TECHNICAL FIELD

The present invention relates to a system and method for securing data, and particularly but not exclusively to a system and method for securing data objects sent in an electronic format.

BACKGROUND OF THE INVENTION

In online environments, electronic data are often distributed from one point to another. Where there is a necessity to secure the data from unauthorized usage or access, particularly in situations where the data are confidential or requires protection, users can utilize a system to encrypt the data prior to sending the data over an unsecured network.

System and methods for encrypting data are known. Such systems, allow a user to select a data object, and then by operation of a client, encrypt the data object with a password or other type of key (such as a PIN (personal identification number) a biomarker, etc.) to create an encrypted data file. This data file is then "secured" against unauthorized users as the contents of the data file cannot be viewed by a user unless the user has the correct information to "un-encrypt" the file. When the data file is required to be decrypted, an authorized user with the password can decrypt the data file by using the client.

Such systems are useful where a user has little or no intention of distributing the encrypted data file. In such arrangements, once the data object is encrypted it can be distributed via unsecured networks. However the user must also find a method to distribute the password for an authorized person to decrypt the object. Often, for the purpose of efficiency, the password is distributed over the unsecured network without any encryption itself. This increases the likelihood of the data object becoming unsecured as the password may be intercepted or distributed to unauthorized parties.

A further concern is that the level of protection offered by standard encryption is minimal since the encryption key is stored within the encrypted data file itself. That is, once the file is received, a hacker has all of the necessary data to decrypt the data file. Moreover, where the user is not technically proficient, an election of an easy to break password could mean the data object is easily decrypted through the use of "brute force" methods.

Even where a safer and more secure password is used to encrypt the data object, the user is still unable to control the manner in which the data object is utilized, as once the password and the data object have been distributed, the permission to manipulate the file will be completely transferred to the receiving user. For example, where a user encrypts the data object, and sends it to another location via the Internet, the receiving user can still distribute the data object without any consideration for the security of the object. For example, a third party may freely distribute the password with the encrypted data file, or remove the encryption altogether and thereby allow a plurality of unknown users to access the data object.

These limitations make it very difficult for a user to securely control the data contained in the electronic file.

SUMMARY OF THE INVENTION

In a first aspect of the present invention, there is provided a method for securing data distributed by a first user to at least one recipient user, comprising the steps of responding to a request from the first user to encrypt the data with a key; and, recording the location of the key in a database, wherein on the database receiving a request from the at least one recipient user for authorization, providing the key to the at least one recipient user upon authorization.

In one embodiment, there is provided a further step of the database receiving rules arranged to constrain the at least one recipient user's interaction with the data.

In one embodiment, the step of authorizing comprises the further steps of comparing an identification profile of the at least one recipient user with a pre-determined criteria, wherein the at least one recipient user is authorized if the pre-determined criteria matches the identification profile.

In one embodiment, the identification profile includes at least one criterion characterizing a characteristic of the at least one recipient user.

In one embodiment, the first user interacts with a client application, the client application requesting the key from a central source.

In one embodiment, the at least one user interacts with at least one receiver application, the at least one receiver application being arranged to request authorization from the central source to decrypt the data.

In one embodiment, the key is generated by one of the central source and the client application.

In one embodiment, the central source comprises a gatekeeper service arranged to protect the server from unauthorized users.

In one embodiment, the central source further comprises a logging service arranged to log any activity on the data by the recipient user.

In one embodiment, the data are included in a file wrapper as an encrypted data string.

In one embodiment, the file wrapper is a secure document arranged to be processed by the receiver application.

In one embodiment, the data object is provided with a secure envelope arranged to enclose the data such that when the data are within the envelope, the at least one recipient user's interaction with the data is constrained by the rules established by the first user.

In a second aspect of the present invention, there is provided a system for securing data distributed by a first user to at least one recipient user, comprising a module arranged for responding to a request from the first user to encrypt the data with a key; and, a routine arranged to recording the location of the key in a database, wherein on the database receiving a request from the at least one recipient user for authorization, providing the key to the at least one recipient user upon authorization.

In one embodiment of the second aspect, the database is arranged to receive rules, the rules being arranged to constrain the at least one recipient user's interaction with the data.

In a third aspect of the present invention, there is provided a computer program comprising at least one instruction for controlling a computer system to implement a method in accordance with the first aspect of the present invention.

BRIEF DESCRIPTION OF THE DRAWINGS

Embodiments of the present invention will now be described, by way of example only, with reference to the accompanying drawings in which:

FIG. 5 is an example of a file wrapper in accordance with an embodiment of the present system.

DETAILED DESCRIPTION OF THE PREFERRED EMBODIMENT

Figure 1:
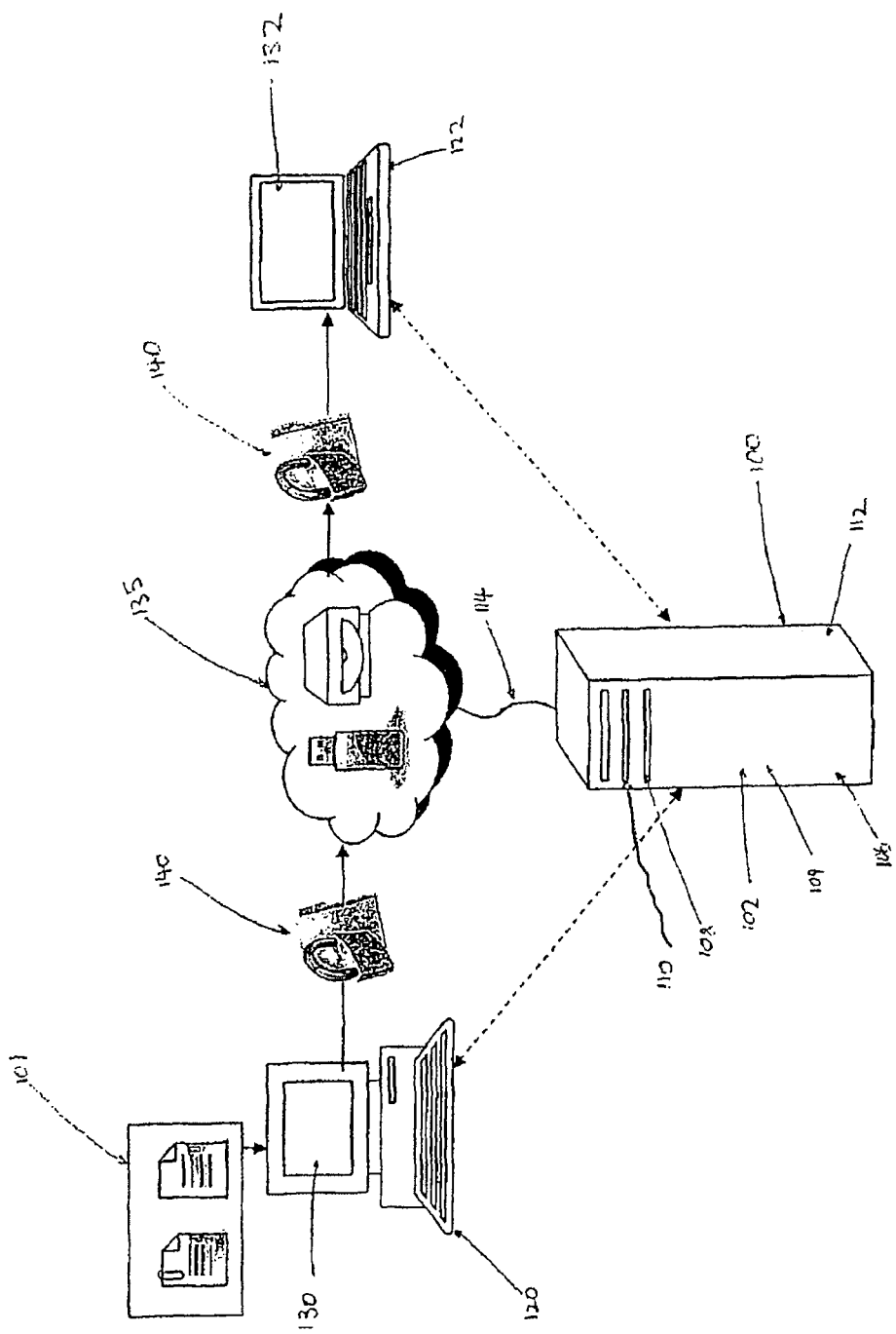
FIG. 1 is a block diagram of the system in accordance with one embodiment of the present invention.

Referring to FIG. 1 an embodiment of the present invention is arranged to provide a system for securing data comprising a central source 100 arranged to respond to a request from a first user to encrypt data with a key and an authorizing service arranged to receive a request for authorization, and whereupon a receiving user is authorized the receiving user is directed to the key for decrypting the data.

In this embodiment the system and methodology and associated software and/or hardware application in accordance with this embodiment of the invention may be executed on a device such as an example device shown in FIG. 1. In FIG. 1 there is shown a schematic diagram of a central source, which in this embodiment is a server 100 suitable for use with an embodiment of the present invention. The server 100 may be used to execute application and/or system services such as a system and method for securing data in accordance with an embodiment of the present invention.

With reference to FIG. 1, the server 100 may comprise suitable components necessary to receive, store and execute appropriate computer instructions. The components may include a processor 102, read only memory (ROM) 104, random access memory (RAM) 106, an input/output devices such as disc drives 108, input devices 110 (such as an Ethernet port, a USB port, etc.), display 112 such as a liquid crystal display, a light emitting display or any other suitable display and communications link 114. The server includes instructions that may be installed in ROM 104, RAM 106 or disc drives 108 and may be executed by the processor 102. There may be provided a plurality of communication links 114 which may variously connect to one or more computing devices such as servers, personal computers, terminals, wireless or handheld computing devices. At least one of a plurality of communications link may be connected to an external computing network through a telephone line or other type of communications link.

In one particular embodiment the device may include storage devices such as a disc drive 108 which may encompass solid state drives, hard disc drives, optical drives or magnetic tape drives. The server 100 may use a single disc drive or multiple disc drives. The server 100 may also use a suitable operating system 116 which resides on the disc drive or in the ROM of the server 100.

In some embodiments, a first user utilizes a computer 120 to execute a client application 130. The computer, in one example, can be a personal computer using an Intel/AMD chipset having an operating system such as Windows™, MAC OS™ or Linux operating systems, or as a person skilled in the art would appreciate, the computer can be a mobile device such as a PALM™ or IPAQ™ device arranged to perform computing functions.

In this embodiment the client application is a software program implemented in any computer language arranged to reside on a storage device of the computer 120. Other examples of implementation of the client application 130 is possible, including, but not limited to the computing instructions stored in ROM, programmable array, optical drives, smart cards, memory units, non-volatile memory modules. The client application 130, in one example has an interface arranged for the user to direct any input or output, or, in other examples, the client application 130 is embedded with an existing software or operating system application, such as, without limitation, Open Office™, or Microsoft Office™, and thereby adding additional functionalities to these software.

The client application 130 has a communication port arranged to communicate with the server 100. When a user initializes the application 130, the application 130 contacts the server 100 via a secure connection such as a SSL or SSH connection. In one example, the application sends its unique identification code, or IP address or other information for the server 100 to identify the user and the computer 120 in which the user is operating from. This allows the server 100 to control the security of the system for securing data by allowing authorization of any communication session between the client application 130 and the server 100 before any such communication sessions can be sustained.

Figure 2:
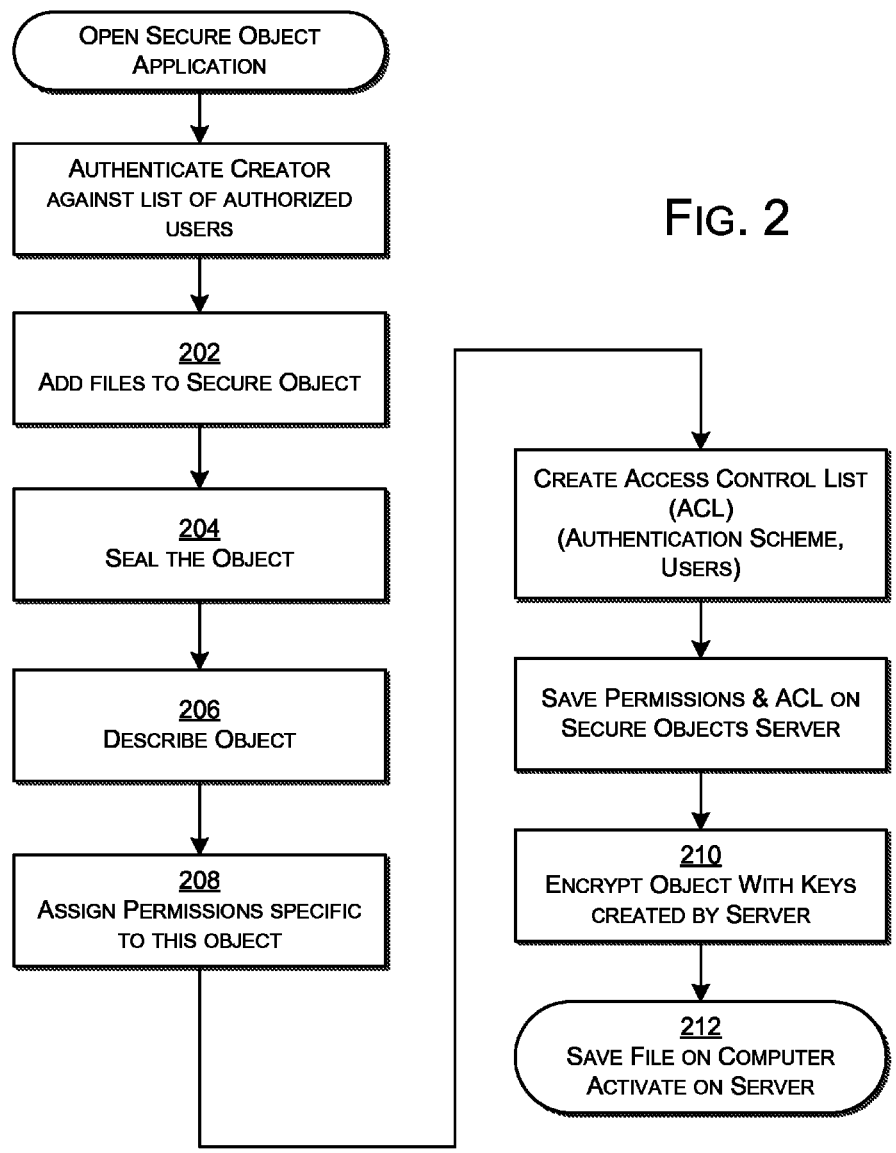
FIG. 2 is a flow diagram of the operation of one aspect of the system in accordance with the embodiment of FIG. 1.

In some embodiments, with reference to FIG. 2, the first user utilizes the client application 130 to select data requiring encryption (202). The data can exist in the form of files 101, addresses, pointers or objects. By using the interface, the first user can drag and drop or otherwise reference and select the data as needed. Once the files are selected, the client application 130 can begin the security process required to secure the data.

In the embodiment described herein, the security process initiates by sealing the data (204) to create a data object such that all of the data (either existing as a file, object, address, pointer or any combination) can be integrated and referenced as a single secure data object 140. Once the secure data object 140 is created, the secure data object 140 is then described by the user, where the user can assign permissions or rules to describe the object (206). The permissions or rules are arranged to control the manner in which the data object 140 can be interacted with or manipulated. In one example, the permissions may demand that the data files within the secure data object 140 are read only, or print only. In another example, the permissions or rules may include what level of users within any specific IP address range using a specific type of computer software can access the files.

Whereupon the permissions have been set by the first user, the client application 130 provides a functionality for the first user to establish an Access Control List (208) which provides a list of recipient users authorized to receive and interact with the secure data object 140. The access control list can in one example also define the authentication scheme necessary for the recipient user to be authenticated. For example, the scheme could demand that the recipient user be operating from a computer with a certain identification code, or the user is operating from a specific local network, or has been approved by some form of biometric scan. The person skilled in the art would also appreciate other variations of authenticating a recipient user.

In this embodiment, upon the establishment of the access control list, the client application 130 begins the encryption process (210). In one example, the encryption process uses AES (Advanced Encryption Standard), or US Federal Information Processing Standard (FIPS) (see for example 'http://www.nist.gov/aes') or other encryption methods as appreciated by a person skilled in the art. To initiate the encryption process (210), the client application 130 either self generates a key arranged for encryption, or in other examples, retrieves a key from the server 100. During the encryption process, the key is not encrypted with the data object 140, and thereby any encrypted secure data 140 object will not contain the key. This provides a strong level of protection, as hackers wishing to decrypt the secure data object 140 cannot utilize methods such as brute force methods to decrypt the secure data object 140 as the key is not within the secure data object 140. The encryption arrangement provides that only users with the key extracted from a separate and independent source from the secure data object 140 can decrypt the secure data object 140.

Upon the completion of the encryption process (210), the client application 130 will return the secure data object 140 as fully encrypted (212). In one example, the secure data object 140 is created by attaching the encrypted data files to a file wrapper 500, which can be implemented in XML or another suitable computer language. In the example, the file wrapper 500 as shown in FIG. 5 provides metadata 502 to describe the secure data object 140 such that when the object is opened with either the receiver or client applications by the user, the application is informed of the information relating to the secure data object 140 to thereby assist in the securing process as herein described. The secure data object is stored as a file residing in memory or on storage device on the computer 120. The first user can have the option of distributing the object via a distribution channel 135 in the form of email, FTP, SSH, storage, CD, USB device, non volatile memory or other electronic forms.

Figure 3:
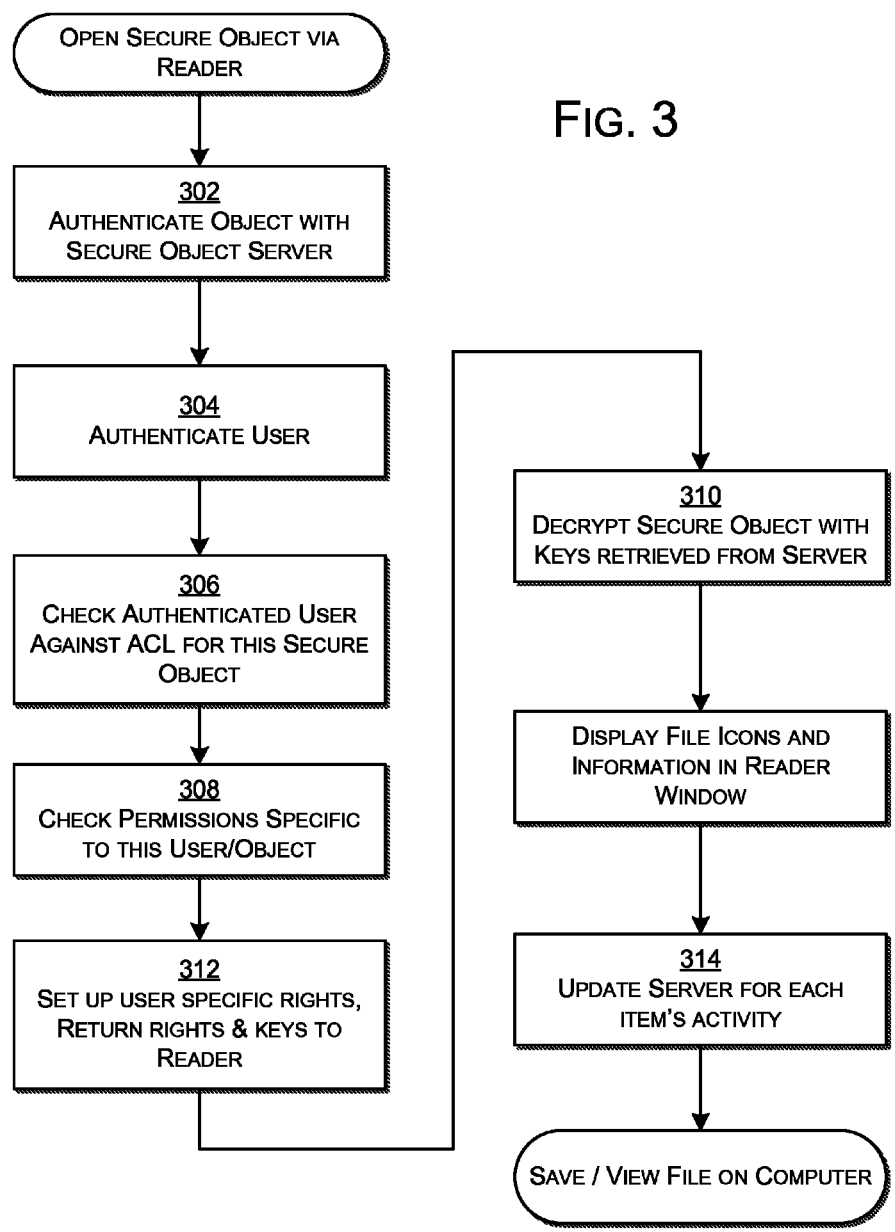
FIG. 3 is a flow diagram of the operation of a second aspect of the system in accordance with the embodiment of FIG. 1.

In one embodiment, the receiver application 132 resides on a recipient user's computer 122, arranged to decrypt a secure data object 140. Upon the possession of a secure data object 140, the recipient user initiates the receiver application 132, which in one example may be integrated into an email software and thereby automatically initiate when the secure data object 140 is received by email. With reference to FIG. 3, the receiver application communicates with the server 100, and establishes a secure connection with the server 100 (302). The server 100 begins an authorization process (304) whereby, in one example, the receiver application 132 sends an identification code to the server such that the recipient user is identified.

In other examples, the recipient user is required to enter sufficient details to be authenticated. The authenticated method are those already defined by the first user when the secure object 140 was created, and as defined above may involve biometric scans, passwords, questions, or other forms of authentication as a person skilled in the art would appreciate.

Upon the successful authentication (304) of the recipient user, the receiver application 132 queries the server 100 for permissions relating to the specific rights and access permissions (306) allowed by the first user for the recipient user. Once these rights are received, the recipient user is bound to only interact with the permissions and rules as defined by the first user. In some examples, where the recipient user is only allowed to view the contents of a data file within the secure data object 140, a browser is initiated by the receiving application 132. The browser is arranged to display the file only, and rejects any attempts by the recipient user to edit the file.

In this embodiment, the receiver application 132 begins the decryption process (308), which firstly requests a direction to the decryption key from the server 100, which is the key used to encrypt the secure data object. The server 100 may store the key within the server, in which case the key is transmitted to the receiver application 132. However in some examples, the key may be stored in a separate server in a different location, and accordingly, the server 100 will send only a direction to the receiver application 132 to retrieve the key from the separate server. In yet another example, the key may be stored in a separate storage media such as a smart card or USB key or CD ROM, in which case, the server 100 sends a direction to the receiver application to direct the user to find the relevant storage media housing the key.

Upon the successful possession of the key (308), the receiver application 132 decrypts the secure data object (310) and delivers the data to the recipient user subject to the constraints already established by the permissions and rules as arranged by the first user (312). Each manipulation or interaction the recipient user makes with the data is recorded and the logs are returned to the server 100 for storage and review (314).

Figure 4:
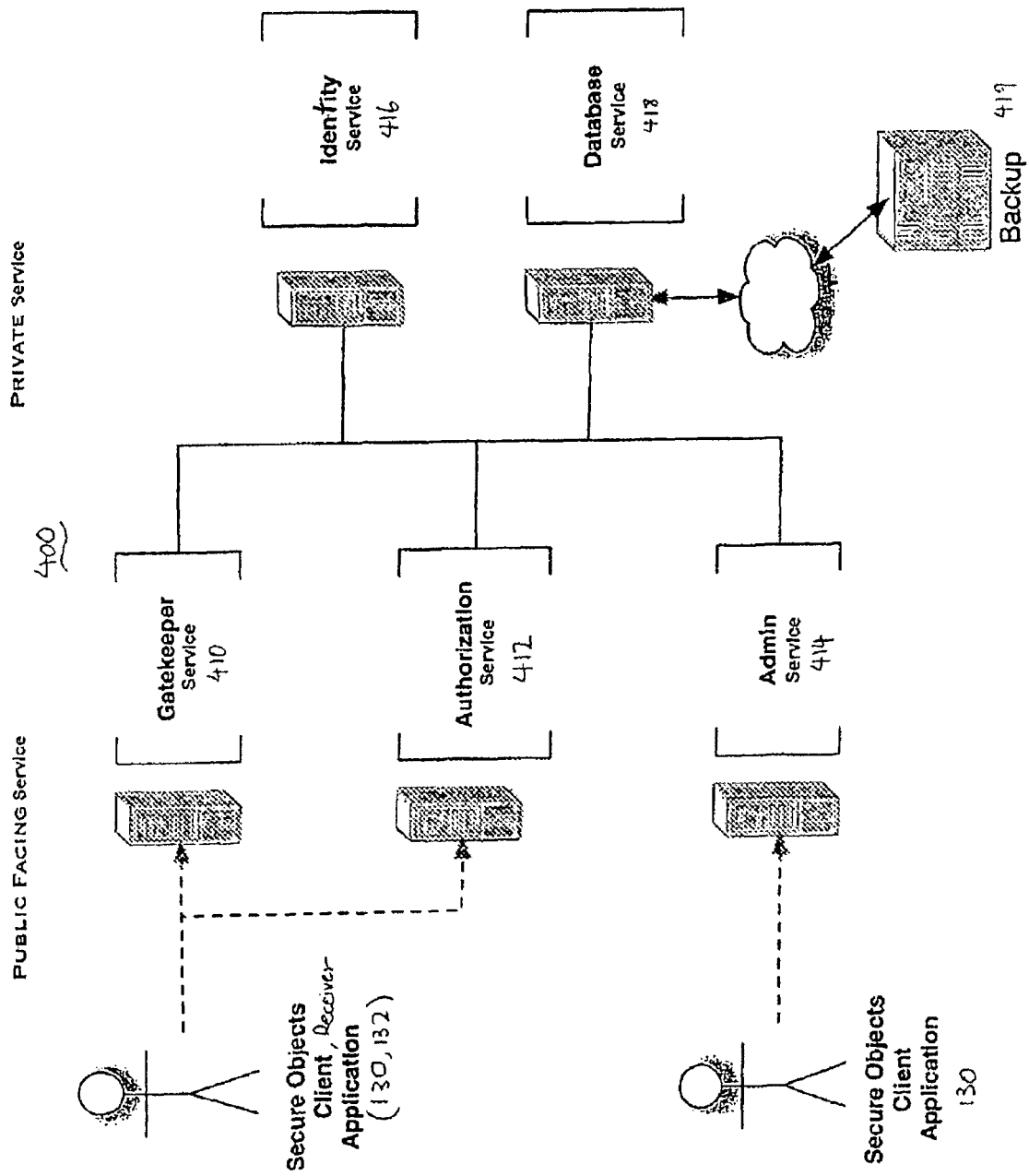
FIG. 4 is a block diagram illustrating the server components in accordance with the embodiment of FIG. 1.

With reference to FIGS. 4, in some embodiments the server 100 comprises a number of server components including, but not exclusively limited to;
- a gatekeeper service 410;
- an authorization service 412;
- an administration service 414;
- an identity service 416;
- a database service 418; and,
- back up service 419.

Each of these services can be deployed on an individual server, or in the example as shown in FIG. 4, exist as computer software implemented in a computer language, machine code or ROM within the server 100 to provide functionality to each of these server components. Each of these services are arranged to communicate with other services and are combined to provide the server 100 to provide a system and method of securing data in accordance to one embodiment of the present invention.

In the embodiment described herein, when the client application or receiver application is in communication with the server 100 the gatekeeper service 410 initiates the session between the applications (130, 132) with the server 100. Once initialized, the gatekeeper service 410 directs the application to connect to the authentication service 412 to authenticate the user.

By directing all initial connections through the gatekeeper service 410, security is further enhanced on the server as the gatekeeper service 410 is arranged to filter out malicious and/or blacklisted web connections which may compromise the security of the server components 400. A person skilled in the art would appreciate that there are many variations in which the gatekeeper service 410 can be implemented, including, but not limited to a hardware and/or software firewall service, which is capable of analyzing incoming traffic.

Should the connection between the user's computer 120, 122 and the server 100 satisfy the requirements of the gatekeeper service 410, the authentication service 412 will then attempt to check and authorize the user. This firstly involves the service to retrieve records from the identity service 416, which stores a list of identification criteria, including, but not limited to user profiles, user authentication means, passwords etc. After these data are retrieved, the user, whether the user is a first user or a recipient user, must be authenticated to continue access to the server 100. In some examples the authentication service 412 may demand the user to enter a password key, profile details or it may detect the client ID, IP addresses, computer identification code, biometric verification or other implements which can be cross referenced with the data within the identity service 416 in order to authenticate and authorize the client session such that the user may continue to access the server components 400.

Once the authentication process has been successfully completed, the server 100 is now able to proceed to process any request for the client 130 or receiver application 132 in order to provide a system and method of securing data as herein described. Where the first user in creating the secure data object 140 has elected to include permissions or rules to restrain the manner in which the recipient user can interact and manipulate the secure data object, the administration service 414 provides functionality for these permissions and rules to be entered, stored and enforced.

In this embodiment, the administration service 414 allows the client application 132 to enter and store at least one permission which would constrain the subsequent usage of the data object by a recipient user. The administration service has an interface, broadcast to the client application 130, referencing the secure data object created by the first user. In one example of the interface, the first user can select from a list of permissions to describe the secure data object 140. These rules include, but not limited to;

the read, write, print permission of the data object; and,
the copy permission of the data object; and,
the share permission of the data object; and,
the redistribution of the data object; and,
specific time periods allowed to access the data object; and,
the person or group of persons allowed to access the data object; and,
who, or in what circumstances if any a back up of the data object permitted; and,
the location, both the network or geographical location of the computer allowed to access the data object.

Once the rules are established by the first user, the user can select to save the rules via the interface. The user can select a submit button or switch which triggers the database service 418 to record the rules and permissions with reference to the secure data object 140 to a database. The database, as can be appreciated by a person skilled in the art includes, but is not limited to, Relational Data Base Management System (RDBMS) such as Oracle™ or Microsoft Access™, object oriented database systems, flat files, or other file structures. Once the rules and permissions are written to the database, they can be retrieved when a recipient user gains access to the referenced secure data object.

Operation of the system will be described with reference to the process as outlined in FIGS. 2 and 3. Firstly a first user prepares and selects the data required to be encrypted and distributed. This can be in one example, one or more data files including documents, spreadsheets, emails, text, graphics, multimedia or other forms of computer data. Upon selection of these data, the first user opens the client application 130 which in one example exists as a software application running on the first user's computer (202). Once the application is initialized the client module contacts the server 100 wherein the gatekeeper service executes a series of checks to verify the integrity of the connection (203). Once the gatekeeper 410 allows the connection, the authorization service 412 is executed to authenticate the user such that the user can be identified as an authorized creator of a secure object. Upon the user being authorized through matching of the requirements of the authorization service (e.g. the entering of a password, key or a biometric scan), the client application continues to maintain a connection with the server 100 and allows the user to add the data files requiring encryption to form a secure data object. In some examples the user may drag one or more files into the interface of the client application 132 and select to close the data object such that the files are then combined to form a single data object (202).

In this embodiment the first user is directed to the server's administration service 414 whereby the first user is given an opportunity to describe the manner in which the data object 140 can be manipulated by a recipient user. In one example the first user accesses the interface and is provided with various rules and permissions to control the manner in which the data object will be manipulated. Some examples of these options have been previously described. The rules and permissions are enforced by the receiver application 132 which is used to access the secure data objects 140 by the recipient user. Once the rules and permissions are entered and selected, the user can select a submit switch or button which triggers the rules to be written to the database via the database service of the server 100. In this example where permissions are written to the database, it is written in the form of an Access Control List (ACL) (208) which is then stored back by the database service 418 of the server 100.

Upon completing the selection of permission and rules for the data files or objects the user can encrypt the objects (210). In one example, the client application 130 then creates a key to encrypt the data to form a secure data object. The encryption process ensures that the key is not embedded into the secure data object such that the secure object on its own will not in any way reveal the encryption key. In another example, the client application 130 requests a key from the server 100, which generates a random key suited for data encryption. An option is given to the user to store the key on the server 100, or to store the key elsewhere but indicate to the server 100, where the key is stored such that an authorized recipient user can be directed to the key. This arrangement reduces the number of keys stored on the server 100, thereby spreading the risk of a security breach to other servers. In this process, a hacker would have an additional hurdle to find the relevant key since the location is not immediately known to any unauthorized user.

Once the client application has encrypted the data selected by the first user; a secure data object is formed by the client application 130. Upon the completion of the encryption process (210) the secured data object 140 is ready to be deployed to any number of recipient users through a distribution channel 135. In some examples the first user can simply email the secure object to a single or multiple recipients or can distribute the object on a Compact Disc, Universal Serial Bus (USB) key or other computer readable medium. An immediate advantage of the current arrangement allows the user to distribute the secure object through any insecure channel, as a hacker would find it extremely difficult to break into the secure data object 140 without locating the key to decrypt the data object. As a secure data object 140 has been encrypted in such a manner whereby the encryption key is not within the secure data object 140, it is therefore extremely difficult for the secure data object 140 to be decrypted.

Upon the reception of the secure data object by a recipient user, the recipient user can start the receiver application 132 as earlier described and load the secure data object 140 into the receiver application 132. In some examples this can involve selecting the secure data object 140 and dragging and dropping it into the interface provided by the receiver application 132. In other examples, the receiver application may be integrated into an existing software package such as Microsoft Word™, Excel™, PowerPoint™, Access™ or Internet Explorer™ or other similar packages. Upon the successful loading of the secure data object 140, the recipient user is then authenticated by the central server 100 when the receiver application 132 connects to the server 100. This authentication may be in the form of a provision of a physical smart card, a USB key, biometric data, a password, a unique user ID located on the user's computer, an IP address or any combination, any of the above, or by other verification techniques that are available. Upon the successful authorization and authentication of the recipient user the receiver application 132 will communicate with the server 100 and be directed to access a decryption key. The decryption key may be stored on the server 100. However, in some instances the server only stores a pointer to a relevant separate location where the key may be saved. In one example a subsequent smart card distributed separately to the secure data object may store the decryption key. In any event the central server 100 will direct the recipient user to a suitable location for retrieving the decryption key. This may require some additional actions on the part of the recipient user such as accessing a separate server or locating a physical media containing a key (e.g. inserting the smart card to the computer 122). Once there is a successful acquisition of the decryption key the receiver application 132 can then decrypt the secure data object 140 and allow the user to manipulate the secure data object 140 as constrained by any permissions and rules that may have been set by the first user. In one example where the first user has limited the recipient user's ability to edit a document that has been encrypted within the secure data object, the recipient user cannot make or save any changes to the document but is limited to only reading, accessing and printing the document.

Figure 6:
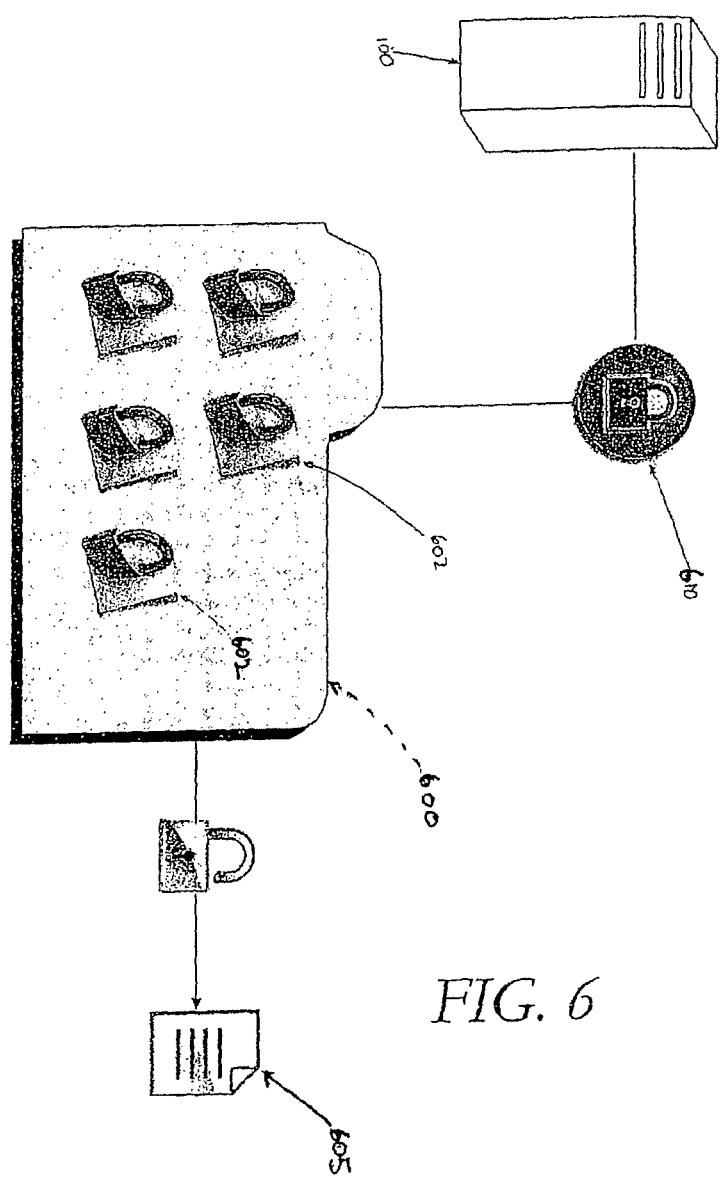
FIG. 6 illustrates an example of the secure data object in accordance with an embodiment of the present system.

In alternative embodiments the secure data object can exist as a secure envelope as shown in FIG. 6. Where the secure data object is a secure envelope 600, the envelope is stored as a file which encloses individual data files 602 stored within the secure envelope 600. The envelope is fully protected under the secure data object system as previously described. However, once the files within the envelope are dragged and removed from the secure envelope and onto the user's computer interface (e.g. the desktop or their own file system) the control and protection as exercised by the current system 610 is then withdrawn, allowing the recipient user to fully interact and manipulate with the data file as would be allowed if the recipient user owned the file outright 605. In this example the first user may create permissions to ensure that the recipient user cannot remove any data file from the secure envelope.

Figure 7:
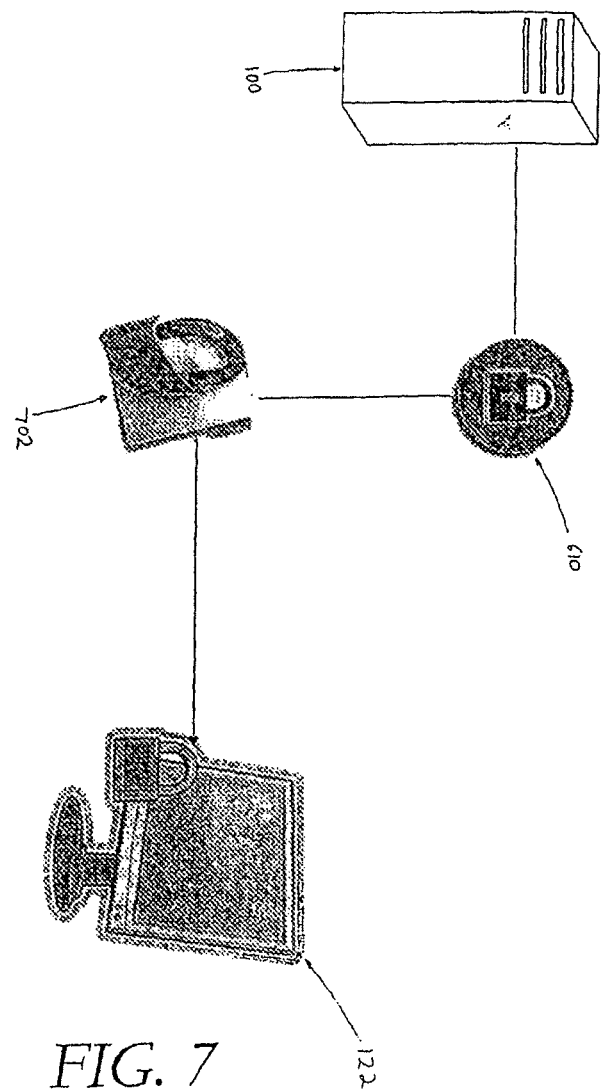
FIG. 7 illustrates another example of the secure data object in accordance with an embodiment of the present system.

In other embodiments where the secure data object exists as a secure document 700, the data file itself is encrypted using the system and method as described with reference to FIG. 7. In this instance the entire file 702 must be accessed through the client application only and, unless otherwise permitted, cannot be distributed or fully copied by the recipient user.

The embodiments described, advantageously do not interact with the data to be encrypted in any manner. In other words, the data to be encrypted is never "passed through" or stored on the central source. This arrangement removes the risk of providing a centralized hub of data which could attract hackers.

In some embodiments, the system is offered as a service to users on a web or online interface. In this embodiment, a license is provided to a user to download and operate the application 130 to encrypt or decrypt data objections in accordance with the steps already mentioned. The license may limit the functionality of the application 130. In one example, the free license will limit the application 130 to only decrypt a file, but on payment the license may be extended to allow the application 130 to encrypt files. In other examples, the license may limit the type of files that may be encrypted or decrypted and thereby limiting user access to certain files. This example is particularly useful in corporate or group environments where each user may be granted different licenses to encrypt or decrypt certain data objections.

Although not required, the embodiments described with reference to the figures can be implemented via an application programming interface (API) or as a series of libraries, for use by a developer, and can be included within another software application, such as a terminal or personal computer operating system or a portable computing device operating system. Generally, as program modules include routines, programs, objects, components and data files that perform or assist in the performance of particular functions, it will be understood that the functionality of the software application may be distributed across a number of routines, objects or components to achieve the same functionality as the embodiment and the broader invention claimed herein. Such variations and modifications are within the purview of those skilled in the art.

It will also be appreciated that where methods and systems of the present invention are implemented by computing systems or partly implemented by computing systems then any appropriate computing system architecture may be utilized. This will include stand-alone computers, network computers and dedicated computing devices. Where the terms "computing system" and "computing device" are used, then these terms are intended to cover any appropriate arrangement of computer hardware for implementing the function described.

The invention claimed is:

1. A method for securing data distributed by a first user to at least one recipient user, comprising the steps of:
    (A) providing a client application and a receiver application;
    (B) using said client application on a first computer:
        (B)(1) authenticating said first user using a secure objects server, said secure objects server being distinct from said first computer, and
        (B)(2) said first user selecting data to be distributed as a secure data object, said selected data comprising multiple data items;
        (B)(3) forming a single data object from said selected data comprising said multiple data items, wherein all of the selected data are integrated and referenced as said single data object;
        (B)(4) said first user describing at least one manner in which said data object can be manipulated by a recipient user;
        (B)(5) assigning one or more permissions specific to said data object to control said at least one manner in which said data object can be manipulated by a recipient user, as described by said first user;
        (B)(6) creating an access control list (ACL) for said data object;
        (B)(7) saving said permissions and said ACL on said secure objects server;
        (B)(8) encrypting the data object formed in (B)(3) with an encryption key obtained from said secure objects server to form said secure data object;
        (B)(9) recording the encryption key in a database associated with said secure objects server;

(C) distributing said secure data object to at least one arbitrary recipient user; and
(D) upon receipt of said secure data object by a particular recipient user,
  (D)(1) using said receiver application on a second computer associated with said particular recipient user, connecting to said secure objects server, said secure objects server being distinct from said second computer, said second computer being distinct from said first computer;
  (D)(2) upon connection of said receiver application to said secure objects server, said secure objects server authenticating said particular recipient user;
  (D)(3) upon successful authentication of said particular recipient user by said secure objects server, said receiver application querying said secure objects server for rules and permissions relating to said secure data object and to said particular recipient user, as assigned by the first user;
  (D)(2) said receiver application obtaining from said secure objects server said rules and permissions relating to said secure data object as assigned by the first user;
  (D)(3) said receiver application obtaining from said database associated with said secure objects server a decryption key for said secure data object, said decryption key corresponding to said encryption key that was used to encrypt the data object to form said secure data object;
  (D)(4) upon successfully obtaining said decryption key from said secure objects server, said receiver application decrypting said secure data object and providing said particular recipient user with access to said data items in said secure data object, said access being subject to constraints established by said first user as specified in said rules and permissions specific to said data object; and
  (D)(5) said receiver application recording particular log information about said particular recipient user's access to said data items in said secure object, and
  (D)(6) said receiver application providing said particular log information to said secure objects server.

2. A method according to claim 1 further comprising:
the database at said secure objects server receiving one or more rules arranged to constrain the at least one recipient user's interaction with the data.

3. A method according to claim 1, wherein the authentication of said particular recipient user in (D)(2) further comprises:
comparing an identification profile of the particular recipient user with pre-determined criteria, wherein the particular recipient user is authorized if the pre-determined criteria matches the identification profile.

4. A method according to claim 3, wherein the identification profile includes at least one criterion characterizing a characteristic of the particular recipient user.

5. A method according to claim 1, further comprising using a gatekeeper service to protect the database from unauthorized users.

6. A method according to claim 1, wherein the data are included in a file wrapper as an encrypted data string.

7. A method according to claim 6, wherein the file wrapper comprises a secure document arranged to be processed by said receiver application.

8. A method according to claim 6, wherein the data object is provided with a secure envelope arranged to enclose the data with such that when the data are within the envelope, the at least one recipient user's interaction with the data is constrained by rules established by the first user.

9. The method according to claim 1, wherein the secure objects server comprises a logging service arranged to receive log information from receiver applications, said log information relating to activity on the data items by recipient users, the method further comprising:
(E) by said logging service at said secure objects server, receiving said particular log information from said receiver application.

10. The method of claim 1, wherein the at least one processor is further configured to execute an interface enabling the first user to define the one or more rules to be applied.

11. The method of claim 1
wherein said describing in (B)(4) is performed in response said client application providing the first user with an option to elect one or more rules to constrain the manner in which said data object can be manipulated by a recipient user, and wherein said describing in (B)(4) comprises selecting at least some of said one or more rules.

12. The method of claim 1 wherein the encryption key is the same as the decryption key.

13. The method of claim 1 wherein the encryption key is generated by the secure objects server in response to a request from the client application.

14. The method of claim 1 wherein said one or more permissions assigned by said first user in (B)(5) comprise authentication requirements.

15. The method of claim 14 wherein the authentication requirements include one or more of: a biometric scan requirement; and a password question requirement.

16. The method of claim 14 wherein the authentication requirements require one or more of:
  (a) the recipient user entering a password key;
  (b) the recipient user providing biometric verification;
  (c) checking the network address of the recipient user's computer;
  (d) checking a computer identification code of the recipient user's computer.

17. The method of claim 1 wherein said selecting data in (B)(2) comprises:
dragging multiple data items into an interface of the client application.

18. The method of claim 17 further comprising:
closing a data object in the interface of the client application to combine the files to form the single data object.

19. The method of claim 1 wherein each data item selected in (B)(2) to be distributed comprises a data item selected from:
a file, an object, an address, and a pointer.

20. The method of claim 1 further comprising:
upon receipt of said secure data object by said particular recipient user,
dragging and dropping the secure data object into an interface of the receiver application.

21. The method of claim 1 wherein
upon receipt of said secure data object by the particular recipient user in (D), the particular recipient user initiates the receiver application.

22. The method of claim 1 wherein the client application is embedded with an existing software or operating system application.

23. The method of claim 1 wherein the recipient application is embedded with an existing software application.

24. The method of claim 1 wherein said client application provides a list of permissions, and wherein said describing in (B)(4) comprises:
selecting one or more of said permissions.

25. The method of claim 1 wherein the list of permissions comprises permissions relating to one or more of:
  reading, writing, printing, copying, sharing, redistribution, and backup of the data object;
  time periods during which access to the data object is permitted;
  a person or group of persons allowed to access the data object; and
  one or more locations at which the data object can be accessed.

26. A non-transitory computer readable medium comprising instructions that when executed by a computer cause the computer to perform a method, in a system in which, using a client application on a first computer,
  (i) a first user selected data to be distributed as a secure data object, said selected data comprising multiple data items; and
  (ii) said first formed a single data object from said selected data, wherein all of the selected data are integrated and referenced as said single data object; and
  (iii) said first user described at least one manner in which said data object can be manipulated by a recipient user; and
  (iv) said first user caused assignment of permissions specific to said data object to control said at least one manner in which said data object can be manipulated by a recipient user; and
  (v) said first user created an access control list (ACL) for said object; and
  (vi) said first user saved said permissions and said ACL on said secure objects server; and
  (vii) said first user caused encryption of the data object with an encryption key obtained from said secure objects server to form said secure data object; and
  (viii) said first user cause said secure data object to be distributed to at least one arbitrary recipient user,
  the method comprising:
  (a) upon receipt of said secure data object by a particular recipient user,
  (a)(1) connecting to said secure objects server, said secure objects server being distinct from said second computer;
  (a)(2) upon connection of said receiver application to said secure objects server, said secure objects server authenticating said particular recipient user;
  (a)(3) upon successful authentication of said particular recipient user by said secure objects server, querying said secure objects server for rules and permissions relating to said secure data object and to said particular recipient user, as assigned by the first user;
  (a)(2) obtaining from said secure objects server said rules and permissions relating to said secure data object as assigned by the first user;
  (a)(3) obtaining from said database associated with said secure objects server a decryption key for said secure data object, said decryption key corresponding to said encryption key that was used to encrypt the data object to form said secure data object;
  (a)(4) upon successfully obtaining said decryption key from said secure objects server, decrypting said secure data object and providing said particular recipient user with access to said data items in said secure data object, said access being subject to constraints established by said first user as specified in said rules and permissions specific to said data object; and
  (a)(5) recording particular log information about said particular recipient user's access to said data items in said secure data object, and (a)(6) providing said particular log information to said secure objects server.

27. A system comprising:
(B) a secure objects server;
(C) a client application on a first computer, distinct from said secure objects server; and
(D) a recipient application on a second computer, distinct from said secure objects server and from said first computer,
wherein said client application provides a first user interface to enable:
  (b)(i) a first user to select data to be distributed as a secure data object, said selected data comprising multiple data items; and
  (b)(ii) said first to form a single data object from said selected data, wherein all of the selected data are integrated and referenced as said single data object; and
  (b)(iii) said first user to describe at least one manner in which said data object can be manipulated by a recipient user; and
  (b)(iv) said first user to cause assignment of permissions specific to said data object to control said at least one manner in which said data object can be manipulated by a recipient user; and
  (b)(v) said first user to create an access control list (ACL) for said object; and
  (b)(vi) said first user to save said permissions and said ACL on said secure objects server; and
  (b)(vii) said first user to cause encryption of the data object with an encryption key obtained from said secure objects server to form said secure data object; and
wherein said receiver application is invoked upon receipt of said secure data object by a particular recipient user, and wherein said receiver application is constructed and adapted to:
  (c)(1) authenticate said particular recipient user with said secure objects server;
  (c)(2) upon successful authentication of said particular recipient user by said secure objects server, query said secure objects server for rules and permissions relating to said secure data object and to said particular recipient user, as assigned by the first user;
  (c)(2) obtain from said secure objects server said rules and permissions relating to said secure data object as assigned by the first user;
  (c)(3) obtain from said database associated with said secure objects server a decryption key for said secure data object, said decryption key corresponding to said encryption key that was used to encrypt the data object to form said secure data object;
  (c)(4) upon successfully obtaining said decryption key from said secure objects server, decrypt said secure data object and provide said particular recipient user with access to said multiple data items in said secure data object, said access being subject to constraints established by said first user as specified in said rules and permissions specific to said data object; and
  (c)(5) to record particular log information about said particular recipient user's access to said data items in said secure data object, and
  (c)(6) provide said particular log information to said secure objects server.

* * * * *